United States Patent
Sun

(10) Patent No.: US 12,375,173 B2
(45) Date of Patent: Jul. 29, 2025

(54) ALARM PROCESSING METHOD AND APPARATUS

(71) Applicant: Huawei Technologies Co., Ltd., Shenzhen (CN)

(72) Inventor: Liang Sun, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 18/060,913

(22) Filed: Dec. 1, 2022

(65) Prior Publication Data

US 2023/0096052 A1 Mar. 30, 2023

Related U.S. Application Data

(63) Continuation of application No. PCT/CN2021/096367, filed on May 27, 2021.

(30) Foreign Application Priority Data

Jun. 2, 2020 (CN) .......................... 202010488897.2

(51) Int. Cl.
*H04B 10/032* (2013.01)
*H04B 10/079* (2013.01)

(52) U.S. Cl.
CPC ......... *H04B 10/032* (2013.01); *H04B 10/079* (2013.01)

(58) Field of Classification Search
CPC ................ H04B 10/032; H04B 10/079; H04B 10/0795; H04J 3/0608; H04J 2203/0051;

(Continued)

(56) References Cited

U.S. PATENT DOCUMENTS 5,757,774 A * 5/1998 Oka .......................... H04J 3/08
370/242
6,115,381 A * 9/2000 Benenti .............. H04Q 11/0478
370/395.21

(Continued)

FOREIGN PATENT DOCUMENTS

CN 101345700 A * 1/2009 ............ H04J 3/1658
CN 102158354 A 8/2011

(Continued)

OTHER PUBLICATIONS

ITU-T G.798, Series G: Transmission Systems and Media, Digital Systems and Networks, Digital terminal equipments—Other terminal equipment, Characteristics of optical transport network hierarchy equipment functional blocks, International Telecommunication Union, Oct. 2010, pp. 1-356, XP044045809.

*Primary Examiner* — Jai M Lee
(74) *Attorney, Agent, or Firm* — SLATER MATSIL, LLP

(57) ABSTRACT

An alarm processing method and apparatus is disclosed. Specifically, a mechanism of configuring and detecting an LOF pre-alarm is provided. A detection condition of the LOF pre-alarm is that it is detected that a frame alignment failure lasts for first duration. A detection condition of the LOF alarm is that it is detected that a frame alignment failure lasts for second duration. The second duration is less than the first duration. When detecting the LOF pre-alarm, a network device inserts a first maintenance signal frame. The first maintenance signal frame supports frame alignment. In other words, a network device that receives the first maintenance signal frame may perform normal frame alignment, so that no alarm is reported, for example, the LOF alarm is not triggered.

12 Claims, 8 Drawing Sheets

(58) Field of Classification Search
CPC ...... H04J 2203/006; H04J 3/1652; H04J 3/14; H04L 43/0835; H04L 41/00; H04L 41/0618; H04L 41/0654
USPC .......................................................... 398/1
See application file for complete search history.

(56) References Cited

U.S. PATENT DOCUMENTS

| | | | |
|---|---|---|---|
| 6,839,871 B2 | 1/2005 | Patel et al. | |
| 6,892,336 B1* | 5/2005 | Giorgetta | H04L 1/0052 714/704 |
| 6,999,480 B2* | 2/2006 | Subrahmanyan | H04J 3/076 370/506 |
| 7,826,345 B2* | 11/2010 | Kam | H04J 3/1611 370/258 |
| 8,285,139 B2* | 10/2012 | Zhou | H04B 10/07953 398/71 |
| 8,356,233 B2* | 1/2013 | Nichols | H04J 3/1652 714/776 |
| 8,934,769 B2 | 1/2015 | Toscano et al. | |
| 9,071,361 B2* | 6/2015 | Ding | H04J 14/0282 |
| 10,044,457 B2* | 8/2018 | Moynihan | H04L 41/0618 |
| 10,396,891 B2* | 8/2019 | Maniloff | H04B 10/032 |
| 10,721,139 B2* | 7/2020 | Holness | H04L 49/555 |
| 2001/0046074 A1* | 11/2001 | Kakizaki | H04B 10/0795 398/5 |
| 2003/0076857 A1* | 4/2003 | Morita | H04J 3/14 370/466 |
| 2006/0187715 A1* | 8/2006 | Narvaez | H04J 3/1617 365/185.24 |
| 2010/0040363 A1* | 2/2010 | Zhou | H04B 10/07953 398/10 |
| 2011/0286742 A1* | 11/2011 | Nichols | H04J 3/1652 398/43 |
| 2013/0039644 A1* | 2/2013 | Taniguchi | H04J 14/0227 398/10 |
| 2014/0314402 A1* | 10/2014 | Moynihan | H04J 3/1652 398/17 |
| 2016/0226578 A1* | 8/2016 | Yuan | H04J 3/0602 |
| 2019/0045282 A1* | 2/2019 | Yin | H04J 3/1652 |

FOREIGN PATENT DOCUMENTS

| | | | |
|---|---|---|---|
| CN | 102158354 B | * | 1/2014 |
| JP | 2009141616 A | * | 6/2009 |

* cited by examiner

ALARM PROCESSING METHOD AND APPARATUS

CROSS-REFERENCE TO RELATED APPLICATIONS

This application is a continuation of International Application No. PCT/CN2021/096367, filed on May 27, 2021, which claims priority to Chinese Patent Application No. 202010488897.2, filed on Jun. 2, 2020. The disclosures of the aforementioned applications are hereby incorporated by reference in their entireties.

TECHNICAL FIELD

Embodiments of this application relate to the field of communication technologies, and in particular, to an alarm processing method and apparatus.

BACKGROUND

A loss of frame (LOF) alarm is a loss of frame on a receiving side of a line. In an optical transport network (OTN), when a fault such as fiber cut occurs between a first network device and a previous-hop network device, the first network device detects an LOF alarm. When the first network device detects the LOF alarm, because a data frame has been lost on the first network device, a next-hop network device may also detect a loss of frame and generate and report an LOF alarm. Therefore, a case in which the next-hop network device erroneously detects the LOF alarm is caused, and consequently, resources are wasted because a subsequent action is executed due to erroneous detection.

SUMMARY

Embodiments of this application provide an alarm processing method, to resolve a problem that resources are wasted due to erroneous detection of an LOF alarm.

According to a first aspect, an embodiment of this application provides an alarm processing method. The method includes: A second network device detects that an LOF pre-alarm occurs on a first working channel, where the first working channel is used to connect the second network device and a first network device, a detection condition of the LOF pre-alarm is that a frame alignment failure on a data frame from the first network device lasts for first duration, the first duration is less than second duration, and the second duration is frame alignment failure duration in a detection condition of an LOF alarm; and the second network device inserts a first maintenance signal frame at an ingress end, where the ingress end is configured to receive the data frame from the first network device through the first working channel, and the first maintenance signal frame is used for frame alignment.

It should be noted that frame alignment failure duration in the detection condition of the LOF pre-alarm is less than the frame alignment failure duration in the detection condition of the LOF alarm. Therefore, the second network device detects, before detecting that the LOF alarm occurs on the first working channel, that the LOF pre-alarm occurs on the first working channel.

In the foregoing solution, when detecting the LOF pre-alarm, the second network device inserts the first maintenance signal frame into a next-hop network device (that is, a third network device), so that the third network device can correctly perform frame alignment. Therefore, the following case does not occur: The third network device erroneously reports an LOF alarm because a working channel between the first network device and the second network device is faulty. A sending resource of the third network device needs to be occupied to report the LOF alarm, and a management device needs to perform subsequent processing on the LOF alarm reported by the third network device, and therefore a processing resource of the management device is occupied. Therefore, resources are wasted when the third network device erroneously reports an alarm.

In a possible design, the method may further include: When detecting that the LOF alarm occurs on the first working channel, the second network device terminates insertion of the first maintenance signal frame at the ingress end, and inserts an alarm indication signal AIS frame at the ingress end. In the foregoing design, when detecting the LOF alarm, the second network device replaces the first maintenance signal frame with the AIS frame, to send the AIS frame to a next hop, so that the next hop reports an AIS alarm in a timely manner.

In a possible design, both the first network device and the second network device are configured with a sub-network connection protection group, and the method may further include: The second network device detects that the LOF alarm occurs on the first working channel, triggers sub-network connection protection group switching of the second network device, and continuously inserts the first maintenance signal frame at the ingress end in third duration. The third duration is duration by which insertion of the AIS frame is delayed after the LOF alarm is detected. The third duration is greater than or equal to duration used by the second network device to complete sub-network connection protection group switching.

In a possible design, after the second network device detects that the LOF alarm occurs on the first working channel, when duration in which the first maintenance signal frame is inserted at the ingress end reaches the third duration and no data frame from the first network device is received, the second network device terminates insertion of the first maintenance signal frame at the ingress end, and inserts the AIS frame at the ingress end.

In the foregoing design, when there is a sub-network connection protection group, when detecting the LOF alarm, the first network device does not immediately insert an AIS frame. To prevent a network device on a subsequent path from mis-switching, sending the MS frame to a next-hop network device is delayed. In a period of time in which the second network device completes switching, the first maintenance signal frame is sent to a next hop, and therefore, the network device on the subsequent path can normally perform frame alignment, and the LOF alarm is not generated because a loss of frame is detected. In addition, in a period of time in which the first network device delays sending of the AIS frame, after completing switching, the first network device can normally receive a data frame from a previous hop, so that the network device on the subsequent path can also normally receive a data frame, and no LOF alarm or AIS alarm is generated, and mis-switching does not occur.

In a possible design, overhead of the first maintenance signal frame includes a first value, and the first value is used to indicate that the first maintenance signal frame is a NULL-type maintenance signal.

In a possible design, the overhead is path monitoring PM segment overhead or tandem connection monitoring TCM segment overhead. For example, an indication field included in the overhead of the first maintenance signal frame is the first value. For example, the indication field may be a status identifier field in the PM segment overhead or a status identifier field in the TCM segment overhead.

According to a second aspect, an embodiment of this application provides an alarm processing method, and the method includes: A third network device detects that an LOF pre-alarm occurs on a second working channel, where the second working channel is used to connect the third network device and a second network device, and a detection condition of the LOF pre-alarm is that a frame alignment failure on a data frame from the second network device lasts for first duration; before detecting that an LOF alarm occurs on the second working channel, the third network device receives a first maintenance signal frame from the second network device through the second working channel, where the first maintenance signal frame is used for frame alignment, a detection condition of the LOF alarm is that a frame alignment failure on a data frame from the second network device lasts for second duration, and the second duration is greater than the first duration; and the third network device performs frame alignment processing on the first maintenance signal frame. Optionally, the third network device sends the first maintenance signal frame to a next-hop network device.

In the foregoing design, after detecting the LOF pre-alarm and before generating the LOF alarm, the third network device receives the first maintenance signal frame that supports normal frame alignment. When no fault occurs between the third network device and a previous-hop network device, normal frame alignment processing can be performed, so that the LOF alarm is not erroneously detected or reported, and resources are not wasted.

In a possible design, the method may further include: The third network device receives an alarm indication signal AIS frame from the second network device through the second working channel after receiving the first maintenance signal frame from the second network device through the second working channel; and the third network device reports an AIS alarm.

In the foregoing design, after receiving the AIS frame, the third network device reports the AIS alarm in a timely manner.

In a possible design, both the second network device and the third network device are configured with a sub-network connection protection group, and the method further includes: The third network device receives an AIS frame from the second network device through the second working channel after receiving the first maintenance signal frame from the second network device through the second working channel; and the third network device triggers sub-network connection protection group switching and reports an AIS alarm.

In the foregoing design, after receiving the AIS frame, the third network device immediately triggers SNCP switching without waiting for a delay of a specific period of time.

In a possible design, overhead of the first maintenance signal frame includes a first value, and the first value is used to indicate that the first maintenance signal frame is a NULL-type maintenance signal.

In a possible design, the overhead is path monitoring PM segment overhead or tandem connection monitoring TCM segment overhead. For example, an indication field included in the overhead of the first maintenance signal frame is the first value. For example, the indication field may be a status identifier field in the PM segment overhead or a status identifier field in the TCM segment overhead.

According to a third aspect, an embodiment of this application provides an alarm processing apparatus. The alarm processing apparatus is applied to a network device such as a second network device or a third network device. The apparatus includes a processor and a memory. The memory is configured to store program code. The processor is configured to read and execute the program code stored in the memory, to implement the method according to the first aspect or any design of the first aspect, or to implement the method according to the second aspect or any design of the second aspect.

According to a fourth aspect, an embodiment of this application provides a computer-readable storage medium. The storage medium stores a software program, and when the software program is read and executed by one or more processors, the method provided in any design of the first aspect or the second aspect may be implemented.

According to a fifth aspect, an embodiment of this application provides a computer program product that includes instructions. When the computer program product is run on a computer, a computer is enabled to perform the method provided in any design of the first aspect or the second aspect.

According to a sixth aspect, an embodiment of this application provides a chip. The chip is connected to a memory, and is configured to read and execute a software program stored in the memory, to implement the method provided in any design of the first aspect or the second aspect.

DETAILED DESCRIPTION OF ILLUSTRATIVE EMBODIMENTS

Figure 1:
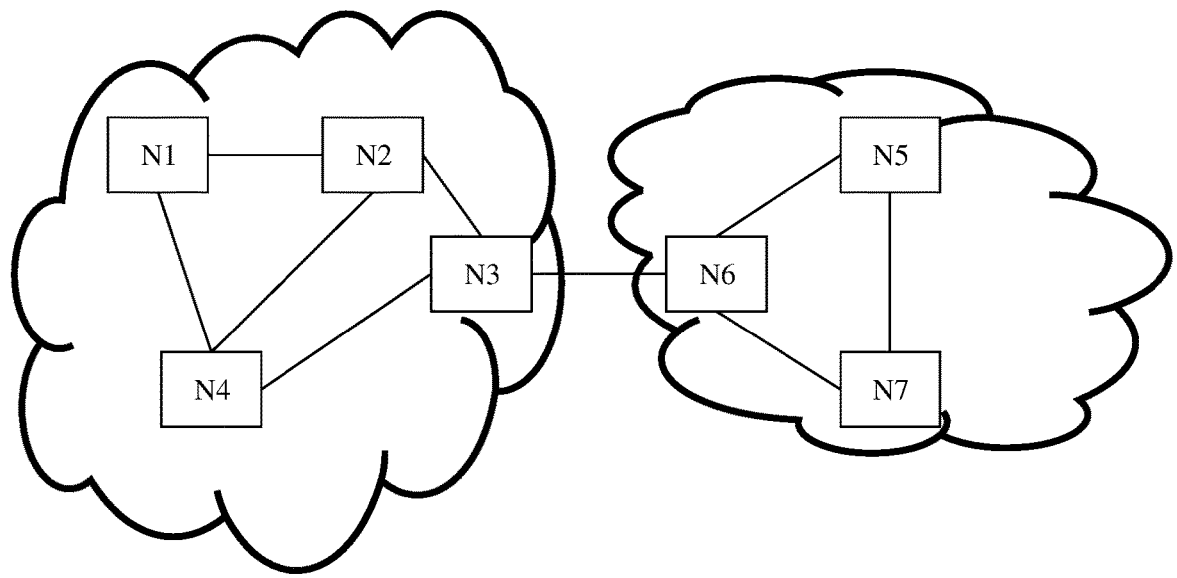
FIG. 1 is a schematic diagram of an OTN network architecture according to an embodiment of this application.

Embodiments of this application are applicable to an optical network, such as an OTN. One OTN is usually formed by connecting a plurality of OTN devices by using optical fibers. Different topology types such as a line type, a ring type, and a mesh type can be formed based on specific requirements. An OTN shown in FIG. 1 includes two OTN networks. Each OTN network includes a specific quantity of OTN devices (N1 to N7). One OTN device may have different functions based on actual requirements. Generally, OTN devices are classified into an optical layer device, an electric layer device, and a photoelectric hybrid device. The optical layer device is a device that can process an optical layer signal, for example, an optical amplifier (OA). The electric layer device is a device that can process an electric layer signal, for example, a device that can process an OTN signal. The photoelectric hybrid device is a device that has a capability of processing the optical layer signal and the electric layer signal. It should be noted that, based on specific integration requirements, one OTN device may be integrated with a plurality of different functions. Technical solutions provided in this application are applicable to OTN devices of different forms and integration degrees. A network device in embodiments of this application may be an OTN device, and the network device may also be referred to as a network node, or is referred to as a node for short.

Figure 2:
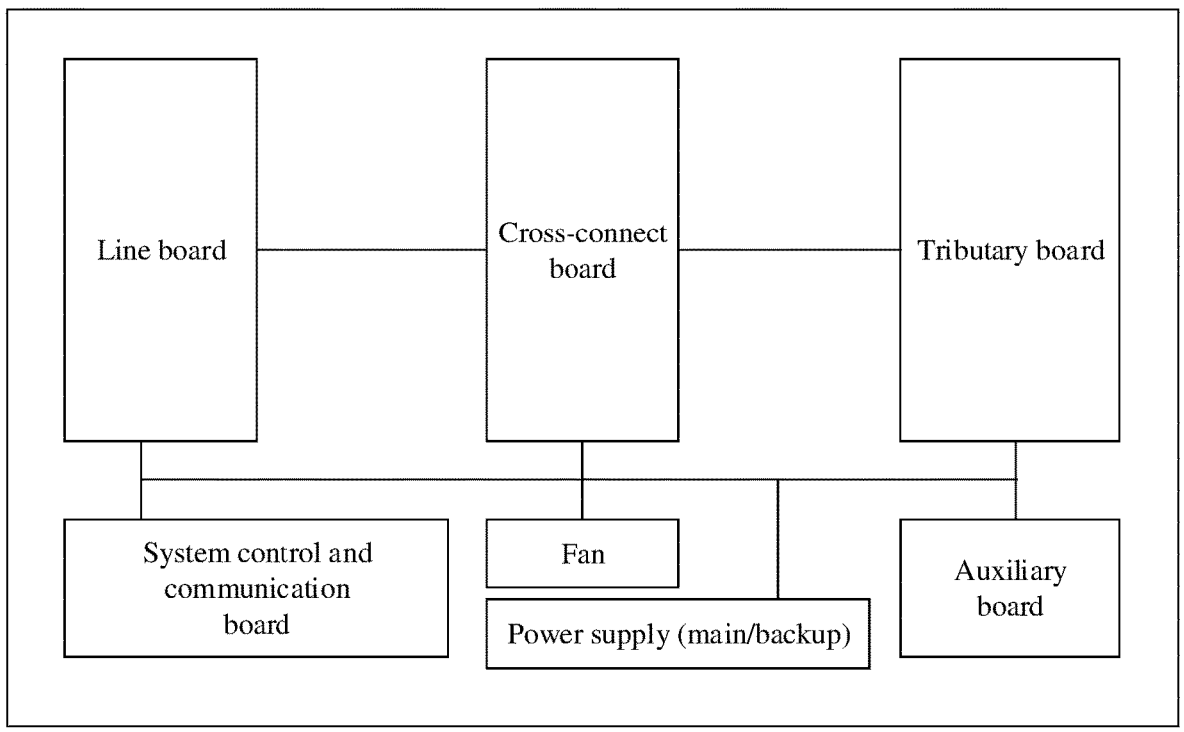
FIG. 2 is a schematic diagram of a structure of an OTN device according to an embodiment of this application.

FIG. 2 is a schematic diagram of a structure of a possible OTN device. The OTN device herein may be the OTN node (N1 to N7) in FIG. 1. Specifically, one OTN device includes a power supply, a fan, and an auxiliary board, and may further include a tributary board, a line board, a cross-connect board, an optical layer processing board, and a system control and communication board. The power supply is configured to supply power to the OTN device, and may include a main power supply and a backup power supply. The fan is used to dissipate heat for the device. The auxiliary board is used for an auxiliary function, for example, providing an external alarm or accessing an external clock. The tributary board, the cross-connect board, and the line board are mainly configured to process an electric layer signal of an OTN. The tributary board is configured to receive and send various client services such as an SDH service, a packet service, an Ethernet service, and a forward service. Further, the tributary board may be divided into a client-side optical module and a signal processor. The client-side optical module may be an optical transceiver, and is configured to receive and/or send service data. The signal processor is configured to implement mapping and de-mapping processing of the service data to a data frame. The cross-connect board is configured to exchange a data frame and exchange one or more types of data frames. The line board mainly processes a data frame at a line side. Specifically, the line board may be divided into a line-side optical module and a signal processor. The line-side optical module may be a line-side optical transceiver, and is configured to receive and/or send a data frame. The signal processor is configured to implement multiplexing and demultiplexing or mapping and de-mapping processing of the data frame at the line side. The system control and communication board is configured to implement system control and communication. Specifically, information may be collected from different boards by using a backplane, or a control instruction may be sent to a corresponding board. It should be noted that, unless otherwise specified, there may be one or more specific components (for example, the signal processor). This is not limited in this application. It should be further noted that, a type of the board included in the device, a specific function design of the board, and a specific quantity of boards are not limited in this embodiment of this application.

It should be noted that devices may include different types and different quantities of boards. For example, a network device used as a core node may not have a tributary board, and a network device used as an edge node may have a plurality of tributary boards.

Technical concepts involved in embodiments of this application are first described below.

(1) Loss of frame (LOF) alarm: The LOF alarm is a loss of frame at a line receiving side. Generally, when it is detected that receiving of bytes A1 and A2 is incorrect, the LOF alarm is detected. The bytes A1 and A2 are frame synchronization bytes.

(2) An alarm indication signal (AIS) is a maintenance signal in an OTN network. A function of the AIS is to transmit alarm information, to be specific, to transmit a service failure signal of an upstream node to a downstream node, or to transmit service layer signal failure information to a client layer.

(3) A data frame may be an OTN frame or a flexible Ethernet (FlexE) frame, and is used to carry various service data, so that the service data can be managed and controlled. The OTN frame may be an optical data unit (ODU) k, an ODUCn, an ODUflex, an optical transport unit (OTU) k, an OTUCn, an optical payload unit (OPU), a flexible OTN (FlexO) frame, or a flexible optical service unit (OSUflex). The data frame may alternatively be another frame structure applicable to an optical network.

(4) Path monitoring (PM) provides an end-to-end path monitoring function. A monitoring range of tandem connection monitoring (TCM) is a part of a monitoring range of a PM.

The OTN includes overhead (OH) of six-level TCM. The TCM includes a trail trace identifier (TTI), bit interleaved parity 8 (BIP8), a backward defect indication (BDI), a backward error indication (BEI), a status indicator (STAT), and a backward incoming alignment error (backward incoming alignment error, BIAE). A TCM function may be configured for a node that requires a TCM function. For each node, TCM in a source direction (or referred to as a transmit direction) and TCM in a sink direction (or referred to as a receive direction) may be configured as different modes or a same mode.

There are an operational (operational) mode and a transparent (transparent) mode in the transmit direction. If a mode of a specific level of TCM used by a network device is the operational mode, the network device performs regeneration processing on the level of TCM, for example, inserting BIP-8, BEI, BIAE, BDI, and TTI. If a mode of a specific level of TCM used by the network device is the transparent mode, the network device does not process the level of TCM.

There is an operational mode, a transparent mode, or a monitoring mode in the receive direction. If a mode of a specific level of TCM used by the network device is the operational mode, the network device monitors the level of TCM, for example, monitors overhead such as BIP-8, BEI, BIAE, BDI, and TTI, generates a corresponding defect, and performs subsequent processing, such as inserting an MS or generating trail signal fail (TSF). If a mode of a specific level of TCM used by the network device is the monitoring mode, the network device monitors the level of TCM, for example, monitors overhead such as BIP8, BEI, BIAE, BDI, and TTI, and generates a corresponding defect, but does not perform processing of subsequent actions of the MS and the TSF. If a mode of a specific level of TCM used by the network device is the transparent mode, the network device does not process the level of TCM.

(5) Sub-network connection protection (SNCP) means that a dedicated protection route is arranged in advance for a specific sub-network connection, and once a sub-network is faulty, the dedicated protection route replaces the sub-network to undertake a transfer task in an entire network. A protection channel in each transmission direction of the SNCP and a working channel pass through different routes. For example, a service is transferred between a node A and a node B through the SNCP; to be specific, the node A transfers the service to the node B separately by using a sub-network 1 (a working SNC, that is, the working channel) and a sub-network 2 (a protection SNC, that is, the protection channel) in a bridging manner, and the node B selects a path of service information from two directions by using a switching switch based on a switching criterion. The node B performs sub-network connection protection group switching, to be specific, switches from receiving the service from the node A in the sub-network 1 to receiving the service from the node A in the sub-network 2.

The SNCP uses a dual feed and selective receiving working mode. Normally, a working SNC is selected to receive a service. When the working SNC is faulty, a protection SNC is selected to receive a service.

The SNCP includes use of non-intrusively monitored sub-network connection protection (non-intrusively monitored sub-network connection protection, SNCP/N) and use of sub-network connection protection with sublayer monitoring (SNCP with sublayer monitoring, SNCP/S). A monitoring method used by the SNCP/N is to detect, in a signal, end-to-end or sublayer overhead or operation administration and maintenance (OAM) information. In the SNCP/S, a service layer defect status, a continuity/connectivity defect status in a layer network, and a bit error degradation status in the layer network are detected, and monitoring is implemented by using the sublayer overhead/OAM. In the SNCP/S, an SF alarm in a PM segment of a service layer and an SF alarm in a TCM segment of a current layer are used as switching conditions. The overhead may be, for example, PM or TCM.

(6) Maintenance signal: Currently, there are three types of maintenance signal frames in the OTN network: an AIS, a locked indication signal (LCK), and an open connection indication (OCI).

A first maintenance signal frame provided in embodiments of this application is different from the foregoing three types of maintenance signal frames. The AIS, the LCK, and the OCI do not support normal frame alignment. The first maintenance signal frame provided in embodiments of this application is used for normal frame alignment. The first maintenance signal frame may be a NULL-type maintenance signal. A frame format used by the first maintenance signal frame is the same as a frame format of a data frame. For example, the data frame is an ODUk, and the format used by the first maintenance signal frame is the same as a format of the ODUk.

Overhead of the first maintenance signal frame includes an indication field. A value of the indication field is used to indicate whether the first maintenance signal frame is a NULL-type maintenance signal. For example, the value of the indication field is a first value, and the first value indicates that the first maintenance signal frame is a NULL-type maintenance signal. For example, the indication field may be a newly defined field in the overhead. For another example, the indication field included in the overhead of the first maintenance signal frame may be a STAT field in PM segment overhead or a STAT field in TCM segment overhead. Table 1 shows meanings of different values of the STAT in the PM segment overhead. For example, when the indication field included in the overhead of the first maintenance signal frame may be the STAT field in the PM segment overhead, the first value may be one of "000", "010", "011", or "100".

TABLE 1

| PM STAT value | Meaning |
| --- | --- |
| 000 | Reserved for use in a future international standard |
| 001 | Normal channel signal |
| 010 | Reserved for use in a future international standard |
| 011 | Reserved for use in a future international standard |
| 100 | Reserved for use in a future international standard |
| 101 | Maintenance signal: LCK |
| 110 | Maintenance signal: OCI |
| 111 | Maintenance signal: AIS |

Table 2 shows meanings of different values of the STAT in the TCM segment overhead. For example, when the indication field included in the overhead of the first maintenance signal frame may be the STAT field in the TCM segment overhead, the first value may be "011" or "100".

TABLE 2

| TCM STAT value | Meaning |
| --- | --- |
| 000 | There is no tandem connection monitoring at a source end |
| 001 | There is tandem connection monitoring but no IAE (a normal signal) at a source end |
| 010 | There is tandem connection monitoring and IAE at a source end |
| 011 | Reserved for use in a future international standard |
| 100 | Reserved for use in a future international standard |
| 101 | Maintenance signal: LCK |
| 110 | Maintenance signal: OCI |
| 111 | Maintenance signal: AIS |

(7) In embodiments of this application, "a plurality of" means two or more. The term "and/or" describes an association relationship for describing associated objects and represents that three relationships may exist. For example, A and/or B may represent the following three cases: Only A exists, both A and B exist, and only B exists. In addition, it should be understood that in descriptions of this application, terms such as "first" and "second" are merely used for distinguishing and description, but should not be understood as indicating or implying relative importance, or should not be understood as indicating or implying a sequence.

This application may be applied to an end-to-end networking manner. In end-to-end networking, an SNCP group may be configured or not configured.

Figure 3:
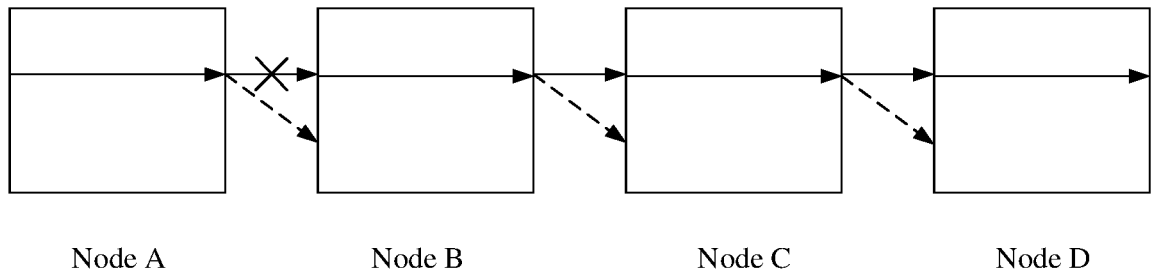
FIG. 3 is a schematic diagram of possible end-to-end networking according to an embodiment of this application.

FIG. 3 is a schematic diagram of possible end-to-end networking according to an embodiment of this application. An end-to-end path is nodes A-B-C-D. The node A sends a data frame to the node D through the node B and the node C. The node A and the node B are connected by using a channel 1, the node B and the node C are connected by using a channel 2, and the node C and the node D are connected by using a channel 3. When a fault such as fiber cut occurs on the channel 1, if the node B continuously detects a loss of frame (or a frame alignment failure) in X ms (millisecond), the node B determines that an LOF alarm is generated, and inserts an AIS frame in a receive direction. The channel in embodiments of this application may also be referred to as a link.

When the node B detects the LOF alarm, the data frame has been lost, and consequently, the node C and the node D cannot receive the data frame. Therefore, the node C and the node D also continuously detect a loss of frame in X ms, and generate and report an LOF alarm. In other words, the node C erroneously detects that the channel 2 is faulty, and the node D erroneously detects that the channel 3 is faulty. Consequently, the node C and the node D further report LOF alarms to a management device due to erroneous detection. Therefore, resources are wasted because the management device needs to perform fault detection on the channel 2 and the channel 3. When an SNCP protection group is configured for all the nodes A to D, the node B performs SNCP group switching when detecting the LOF alarm. Similarly, when detecting the LOF alarm, the nodes C and D also perform SNCP group switching. When only the channel 1 is faulty, the nodes C and D may perform mis-switching, and resources are wasted.

To avoid a problem that resources are wasted because the network device reports the LOF alarm or performs mis-switching due to erroneous detection, embodiments of this application provide an alarm processing method and apparatus, and specifically provide a mechanism of configuring and detecting an LOF pre-alarm. A detection condition of the LOF pre-alarm is that it is detected that a frame alignment failure lasts for first duration. A detection condition of the LOF alarm is that it is detected that a frame alignment failure lasts for second duration. The second duration is less than the first duration. When detecting the LOF pre-alarm, the network device inserts a first maintenance signal frame. The first maintenance signal frame is used for frame alignment. In other words, a network device that receives the first maintenance signal frame may perform normal frame alignment, so that no alarm is reported, for example, the LOF alarm is not triggered. Therefore, the network device that receives the first maintenance signal frame does not erroneously generate the LOF alarm because a frame alignment failure lasts for the second duration, and therefore does not erroneously report the LOF alarm or perform mis-switching, and resource waste is avoided.

Embodiments of this application are applicable to a scenario in which an SNCP group is configured or a scenario in which an SNCP group is not configured. Solutions provided in embodiments of this application are described in detail with reference to the two scenarios.

Scenario 1

For example, a transmission path includes a first network device, a second network device, and a third network device, and no SNCP group is configured for the first network device, the second network device, and the third network device. The first network device, the second network device, and the third network device each include an ingress end and an egress end. The ingress end may also be referred to as a receive port, and is configured to receive a signal sent by a previous-hop network device. The egress end may also be referred to as a transmit port, and is configured to send a signal to a next-hop network device.

Figure 4:
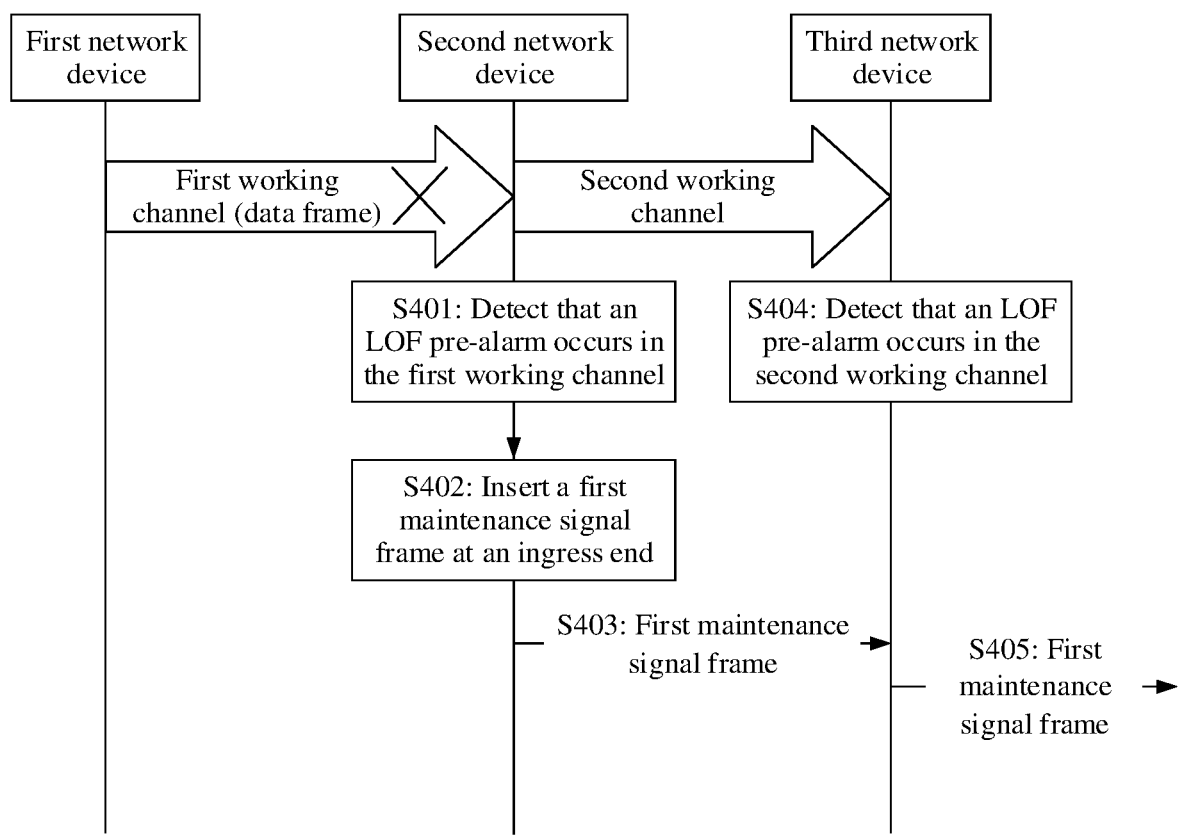
FIG. 4 is a schematic flowchart of a possible alarm processing method according to an embodiment of this application.

FIG. 4 is a schematic flowchart of a possible alarm processing method according to an embodiment of this application. The alarm processing method includes S401 to S405.

S401: A second network device detects that an LOF pre-alarm occurs on a first working channel, where the first working channel is used to connect the second network device and a first network device.

A detection condition of the LOF pre-alarm is that a frame alignment failure on a data frame from the first network device lasts for first duration, the first duration is less than second duration, and the second duration is frame alignment failure duration in a detection condition of an LOF alarm.

Frame alignment duration in the detection condition of the LOF pre-alarm is less than the frame alignment failure duration in the detection condition of the LOF alarm. Therefore, the second network device detects, before detecting that the LOF alarm occurs on the first working channel, that the LOF pre-alarm occurs on the first working channel.

If a frame alignment failure of the second network device on the data frame received by using the first working channel lasts for the first duration, it is detected that the LOF pre-alarm occurs on the first working channel. If the frame alignment failure lasts for the second duration, it is detected that the LOF alarm occurs on the first working channel. Certainly, if a data frame is detected after it is detected that the LOF pre-alarm occurs on the first working channel and before it is detected that the LOF alarm occurs, it can be determined that the first working channel is a normal channel. Further, the second network device terminates insertion of a first maintenance signal frame.

For example, the second network device may determine, in the following manner 1 or manner 2 before detecting that the LOF alarm occurs, that the data frame is detected.

Manner 1: If the data frame from the first network device is received in duration 1, it is determined that the data frame is detected. The duration 1 is less than a difference between the second duration and the first duration.

Manner 2: After it is detected that the LOF pre-alarm occurs on the first working channel, and before it is detected that the LOF alarm occurs, if a quantity of data frames received from the first network device reaches a threshold 1, it is determined that the data frame is detected.

The data frame is instantaneously sent from a channel due to jitter, and the second network device detects the data frame. Consequently, the second network device may erroneously determine that the channel is not faulty, and therefore, a fault recovery procedure cannot be started in a timely manner, and consequently, service interruption duration is prolonged. In the foregoing manner, even if the data frame is instantaneously sent due to jitter, the second network device does not continuously detect the data frame or a quantity of detected data frames does not reach the threshold in the duration 1, and therefore does not erroneously determine that the channel is not faulty.

S402: The second network device inserts the first maintenance signal frame at an ingress end.

The ingress end is used to receive the data frame from the first network device through the first working channel.

Optionally, in S403, the second network device sends the first maintenance signal frame to a third network device through a second working channel.

The second working channel is used to connect the second network device and the third network device, and the first maintenance signal frame is used for frame alignment.

It should be noted that when the second working channel and the first working channel belong to different TCM segments, an egress end of the second network device modifies TCM segment overhead of the first maintenance signal frame, and then sends the modified first maintenance signal frame to the third network device. The modified first maintenance signal frame and the first maintenance signal frame have a same function, and both support normal frame alignment and do not trigger alarming.

S404: The third network device detects that an LOF pre-alarm occurs on the second working channel, where the second working channel is used to connect the third network device and the second network device.

The second network device sends the first maintenance signal frame to the third network device through the second working channel. If no fault occurs on the second working channel, the third network device can normally receive the first maintenance signal frame. If the third network device receives the first maintenance signal frame from the second network device through the second working channel before detecting that the LOF alarm occurs on the second working channel, the third network device may perform frame alignment processing on the first maintenance signal frame, and performs S405.

S405: The third network device sends the first maintenance signal frame. Specifically, the third network device sends the first maintenance signal frame to a next-hop network device of the third network device.

In the solution provided in this embodiment of this application, when detecting the LOF pre-alarm, the second network device has not detected the LOF alarm in this case, and inserts the first maintenance signal frame into a next-hop network device (that is, the third network device), and the third network device may perform frame alignment processing on the first maintenance signal frame. Therefore, the following case does not occur: When a working channel between the first network device and the second network device is faulty, frame alignment failure duration reaches the second duration, and therefore, the LOF alarm is erroneously detected, and the LOF alarm is reported, and consequently, resources are wasted.

For example, after detecting the LOF pre-alarm, if the third network device receives the first maintenance signal frame or a normal signal frame that is sent by the second network device, the third network device cancels the LOF pre-alarm.

In a possible implementation, when detecting that the LOF alarm occurs on the first working channel, the second network device terminates insertion of the first maintenance signal frame at the ingress end, and inserts an alarm indication signal AIS frame at the ingress end. Further, if the third network device receives the AIS frame from the second network device after receiving the first maintenance signal frame, the third network device may report an MS alarm.

The foregoing solution is described in detail below by using an example in which the first duration is Y ms and the second duration is X ms. The networking manner shown in FIG. 3 is used as an example. An end-to-end path includes a node A to a node D. The node A sends a data frame to the node D through a node B and a node C. An egress end of the node A is connected to an ingress end of the node B by using a channel 1, an egress end of the node B is connected to an ingress end of the node C by using a channel 2, and an egress end of the node C is connected to an ingress end of the node D by using a channel 3. No SNCP group is configured for the node A to the node D.

Figure 5:
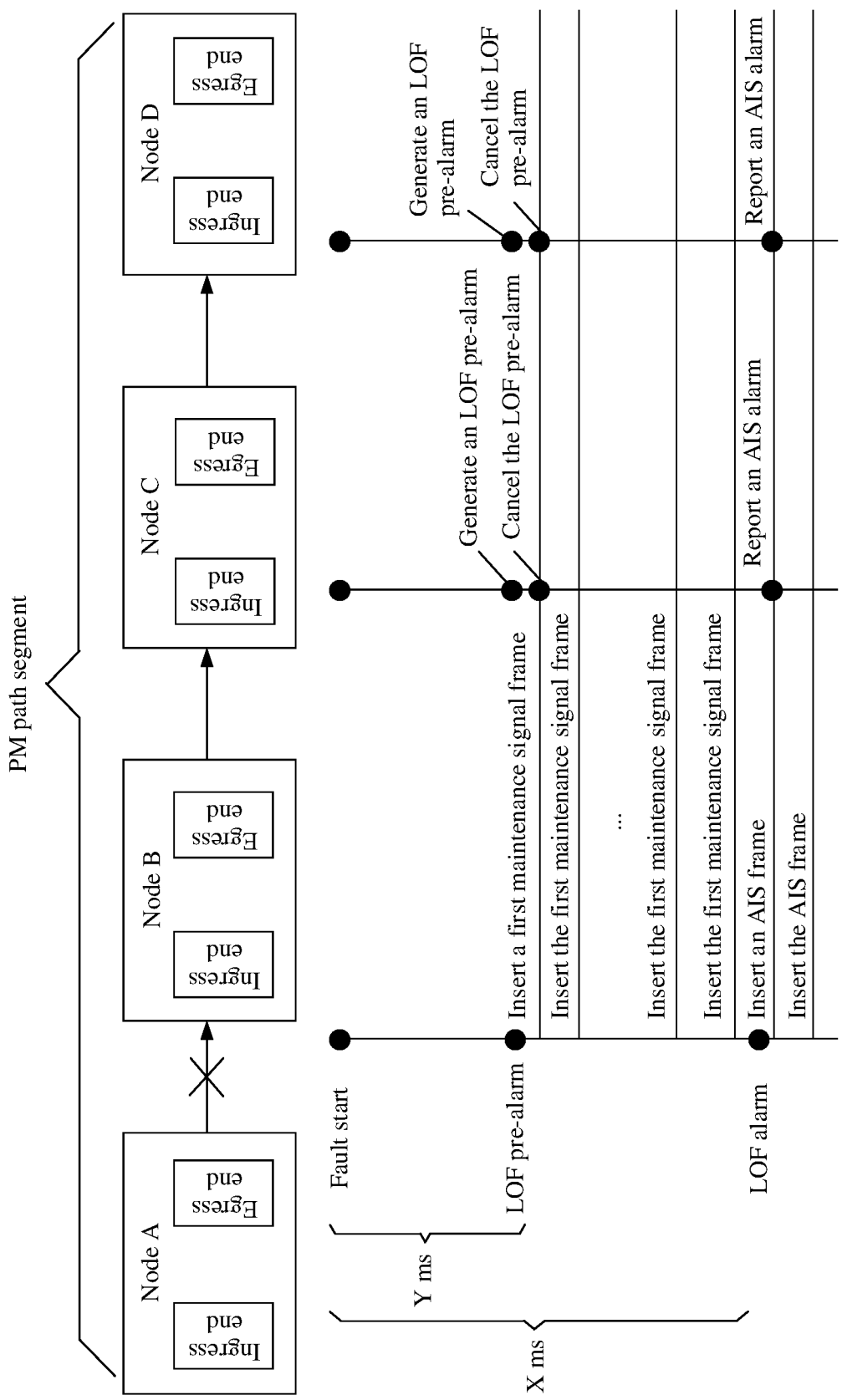
FIG. 5 is a schematic diagram of a possible alarm processing procedure in a scenario 1 according to an embodiment of this application.

Example 1: The node A and the node B, the node B and the node C, and the node C and the node D belong to a same PM path segment, but a TCM function is not configured. FIG. 5 is a schematic diagram of a possible alarm processing procedure in a scenario 1 according to an embodiment of this application. In FIG. 5, for example, the channel 1 between the egress end of the node A and the ingress end of the node B is faulty, and both the channel 2 and the channel 3 are normal channels. When the channel 1 is faulty, the ingress end of the node B cannot receive a data frame from the node A, that is, when a frame alignment failure is continuously detected in Y ms after the start of the fault, it is detected that an LOF pre-alarm occurs on the channel 1. An ingress end of the node C cannot receive a data frame from the node B either. Therefore, the node C also detects that an LOF pre-alarm occurs, and the node D also detects that an LOF pre-alarm occurs.

When detecting that the LOF pre-alarm occurs on the channel 1, the node B continuously inserts the first maintenance signal frame at the ingress end of the node B. The egress end of the node B forwards the first maintenance signal frame to the node C. After receiving the first maintenance signal frame, the node C can perform normal frame alignment on the first maintenance signal frame. If the node B continuously detects a frame alignment failure in X ms from the start of the fault, the node B detects that an LOF alarm occurs on the channel 1. The node B terminates insertion of a first maintenance signal frame at the ingress end, and inserts an AIS frame at the ingress end. Therefore, before receiving the AIS frame, the node C continuously receives the first maintenance signal frame, and detects no LOF alarm. Similarly, the node D detects no LOF alarm before receiving the AIS.

Figure 6:
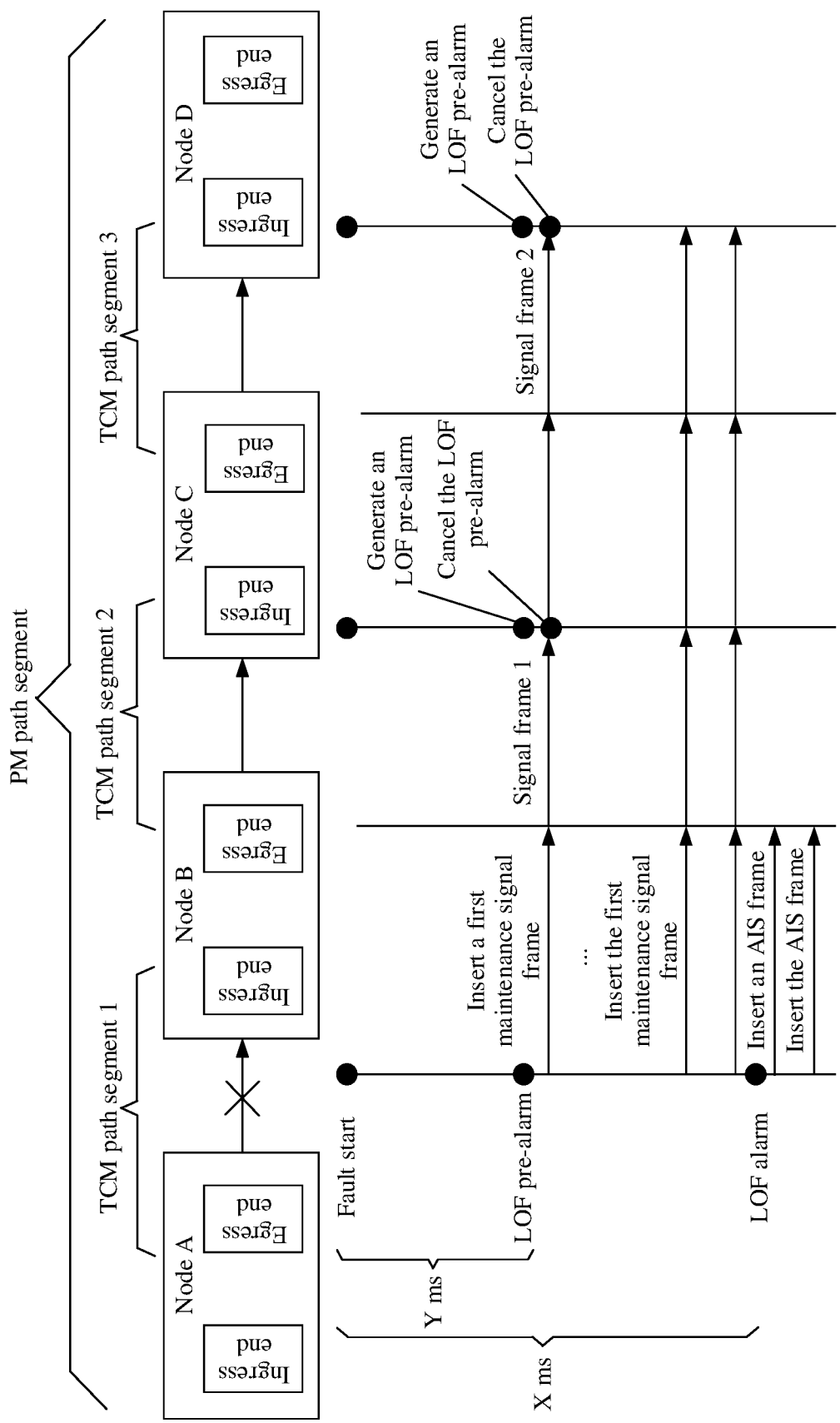
FIG. 6 is a schematic diagram of another possible alarm processing procedure in a scenario 1 according to an embodiment of this application.

Example 2: The node A and the node B, the node B and the node C, and the node C and the node D belong to a same PM path segment but belong to different TCM path segments. FIG. 6 is a schematic diagram of another possible alarm processing procedure in a scenario 1 according to an embodiment of this application. In FIG. 6, for example, the channel 1 between the node A and the node B is faulty.

When detecting that an LOF pre-alarm occurs on the channel 1, the node B continuously inserts the first maintenance signal frame at the ingress end. However, because the ingress end of the node B and the egress end of the node B belong to different TCM path segments, the egress end of the node B modifies TCM overhead of the first maintenance signal frame, and sends the modified first maintenance signal frame to the node C. The modified first maintenance signal frame and the first maintenance signal frame have a same function on each node, and both are used for normal frame alignment and are processed based on a normal signal frame. After receiving the modified first maintenance signal frame, the node C can perform normal frame alignment on the modified first maintenance signal frame. For ease of description, the first maintenance signal frame modified by the node B is referred to as a signal frame 1, and the first maintenance signal frame modified by the node C is referred to as a signal frame 2. If the node B continuously detects a frame alignment failure in X ms from the start of the fault, the node B detects that an LOF alarm occurs on the channel 1. The node B terminates insertion of the first maintenance signal frame at the ingress end, and inserts an MS frame at the ingress end. Therefore, after detecting the LOF pre-alarm, the node C can receive the signal frame 1 that can be used for normal frame alignment, and detects no LOF alarm. Similarly, the node D detects no LOF alarm either.

Scenario 2

For example, an SNCP group is configured for all network devices on a transmission path. Specifically, a first working channel and a first protection channel are deployed between a first network device and a second network device, and a second working channel and a second protection channel are deployed between the second network device and a third network device. The first network device, the second network device, and the third network device each include an ingress end and an egress end. The ingress end is also be referred to as a receive port, and is configured to receive a signal sent by a previous-hop network device. The egress end is also be referred to as a transmit port, and is configured to send a signal to a next-hop network device.

Figure 7:
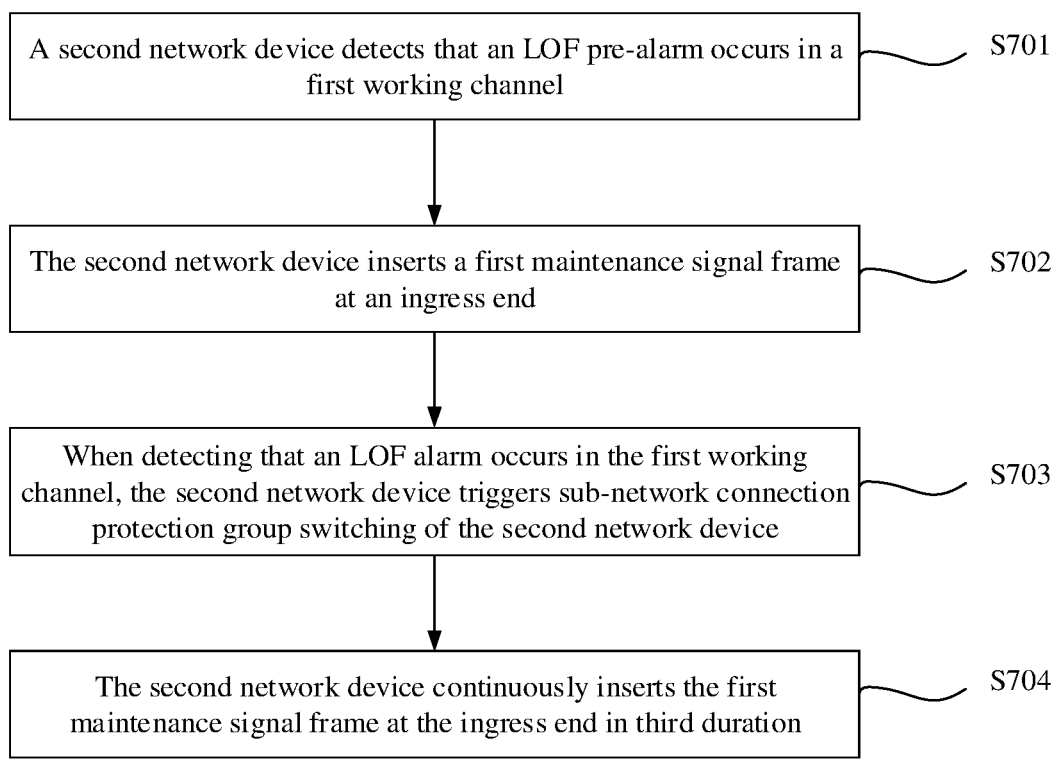
FIG. 7 is a schematic flowchart of another possible alarm processing method according to an embodiment of this application.

FIG. 7 is a schematic flowchart of another possible alarm processing method according to an embodiment of this application. The alarm processing method includes S701 to S703.

S701: A second network device detects that an LOF pre-alarm occurs on a first working channel.

S702: The second network device inserts a first maintenance signal frame at an ingress end.

S703: When detecting that an LOF alarm occurs on the first working channel, the second network device triggers sub-network connection protection group switching of the second network device. Specifically, the second network device switches a receive channel from the first working channel to a first protection channel.

A detection condition of the LOF pre-alarm is that a frame alignment failure on a data frame from the second network device lasts for first duration, a detection condition of the LOF alarm is that a frame alignment failure on the data frame from the second network device lasts for second duration, and the second duration is greater than the first duration.

Optionally, the foregoing method may further include the following step:

S704: The second network device inserts the first maintenance signal frame at the ingress end in third duration. The third duration is duration by which insertion of an AIS frame is delayed after the LOF alarm is detected. The third duration is greater than or equal to duration used by the second network device to complete sub-network connection protection group switching.

In the foregoing solution, when detecting the LOF pre-alarm, the second network device has not detected the LOF alarm in this case, and inserts the first maintenance signal frame into a next-hop network device (that is, the third network device), and the third network device may perform frame alignment processing on the first maintenance signal frame. Therefore, the following case does not occur: When an upstream link is faulty, duration in which the data frame cannot be detected lasts for the second duration, and the LOF alarm is erroneously detected and reported, and consequently, resources are wasted.

For example, if the second network device completes sub-network connection protection group switching in the third duration, the second network device switches the receive channel from the first working channel to the first protection channel. However, the first protection channel is also faulty. The second network device cannot receive a data frame from a first network device through the first protection channel. The second network device terminates insertion of the first maintenance signal frame at an ingress end corresponding to the first working channel, and inserts an AIS frame at the ingress end corresponding to the first working channel.

In this embodiment of this application, an SNCP/S TCM cascading manner, an SNCP/N TCM cascading manner, or an SNCP/N PM cascading manner may be used for networking.

Figure 8:
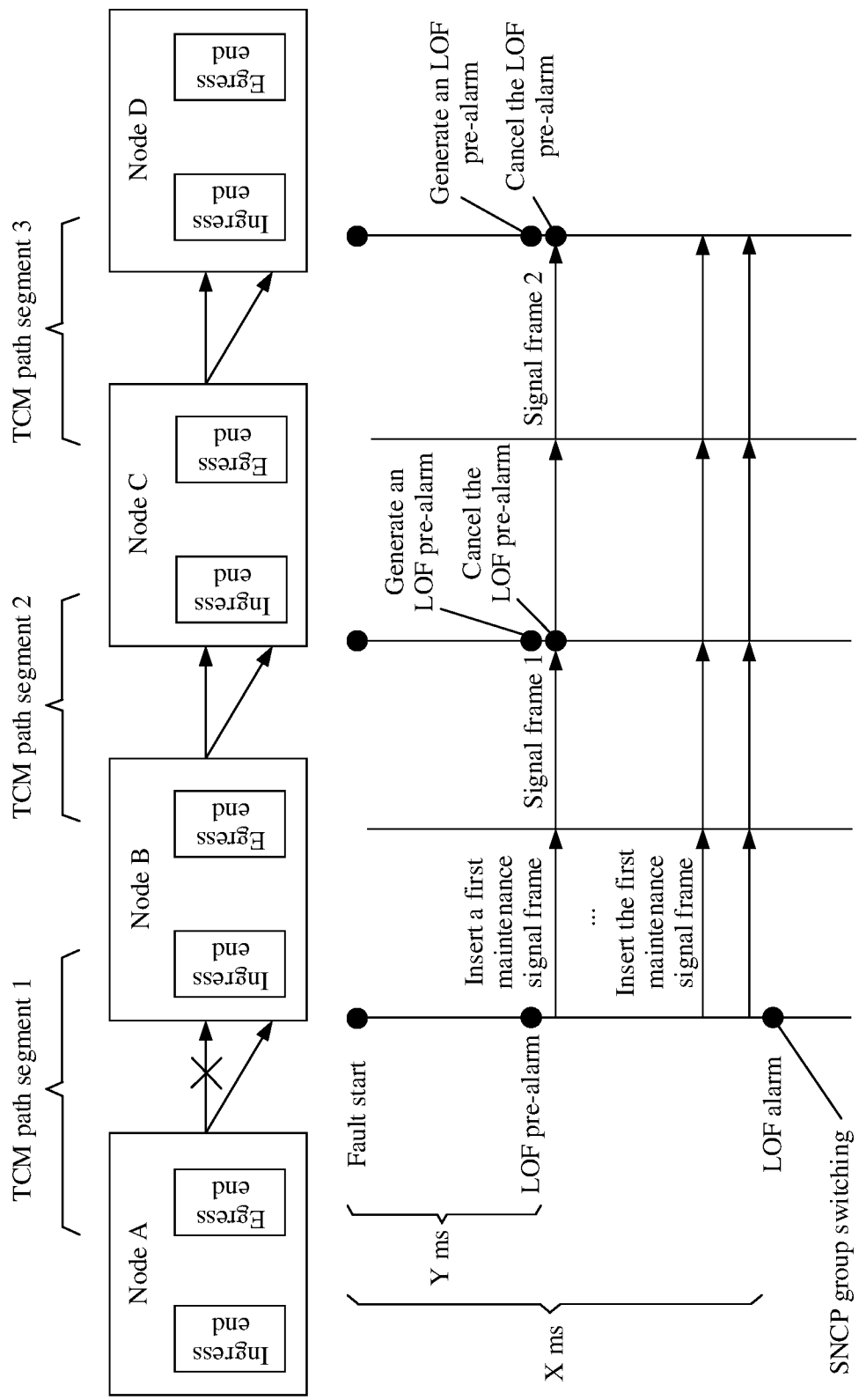
FIG. 8 is a schematic diagram of an alarm processing procedure in SNCP/S TCM cascaded networking according to an embodiment of this application.

FIG. 8 is a schematic diagram of an alarm processing procedure in SNCP/S TCM cascaded networking according to an embodiment of this application. The foregoing solution is described in detail by using an example in which the first duration is Y ms and the second duration is X ms.

In FIG. 8, an end-to-end path includes a node A to a node D configured with an SNCP group, and the node A sends a data frame to the node D through a node B and a node C. Both the node A and the node D are configured with a PM function and a TCM function, and the node B and the node C are configured with a TCM function. For example, a TCM mode is an operational mode. In FIG. 8, the node A and the node B, the node B and the node C, and the node C and the node D belong to a same PM path segment but belong to different TCM path segments. A path between the node A and the node B is a TCM path segment 1, a path between the node B and the node C is a TCM path segment 2, and a path between the node C and the node D is a TCM path segment 3. Two channels are configured between the node A and the node B: a working channel 1 and a protection channel 1. The node A sends a data frame to the node B through the working channel 1 and the protection channel 1, and the node B chooses to receive the data frame through the working channel 1 or the protection channel 1. Two channels are configured between the node B and the node C: a working channel 2 and a protection channel 2. The node B sends a data frame to the node C through the working channel 2 and the protection channel 2, and the node C chooses to receive the data frame through the working channel 2 or the protection channel 2. Two channels are configured between the node C and the node D: a working channel 3 and a protection channel 3. The node C sends a data frame to the node D through the working channel 3 and the protection channel 3, and the node D chooses to receive the data frame through the working channel 3 or the protection channel 3.

When detecting that an LOF pre-alarm occurs on the working channel 1, the node B continuously inserts the first maintenance signal frame at an ingress end. However, because the ingress end of the node B and an egress end of the node B belong to different TCM path segments, the egress end of the node B modifies TCM overhead of the first maintenance signal frame, and sends the modified first maintenance signal frame to the node C through the working channel 2 and the protection channel 2. The modified first maintenance signal frame and the first maintenance signal frame have a same function on each node, and both support normal frame alignment and are processed based on a normal signal frame. After receiving the modified first maintenance signal frame through the working channel 2, the node C can perform normal frame alignment on the modified first maintenance signal frame. For ease of description, the first maintenance signal frame modified by the node B is referred to as a signal frame 1, and the first maintenance signal frame modified by the node C is referred to as a signal frame 2. If the node B continuously detects a frame alignment failure in X ms from the start of the fault, the node B detects that an LOF alarm occurs on the working channel 1. The node B terminates insertion of the first maintenance signal frame at the ingress end, and inserts an AIS frame at the ingress end. Therefore, after detecting the LOF pre-alarm, the node C can receive the signal frame 1 that is used for normal frame alignment, and detects no LOF alarm. Similarly, the node D detects no LOF alarm either.

Optionally, when the node A to the node D are networked in an SNCP/S TCM cascading manner, after the AIS is inserted into the ingress end of the node B, the egress end modifies TCM overhead of the AIS, and the modified MS belongs to a normal signal frame. Therefore, a next hop does not erroneously trigger SNCP group switching because the MS is received. Therefore, when detecting that the LOF alarm occurs on the working channel 1, the node B may not delay insertion of the AIS frame, and insert the AIS frame in a timely manner.

Figure 9:
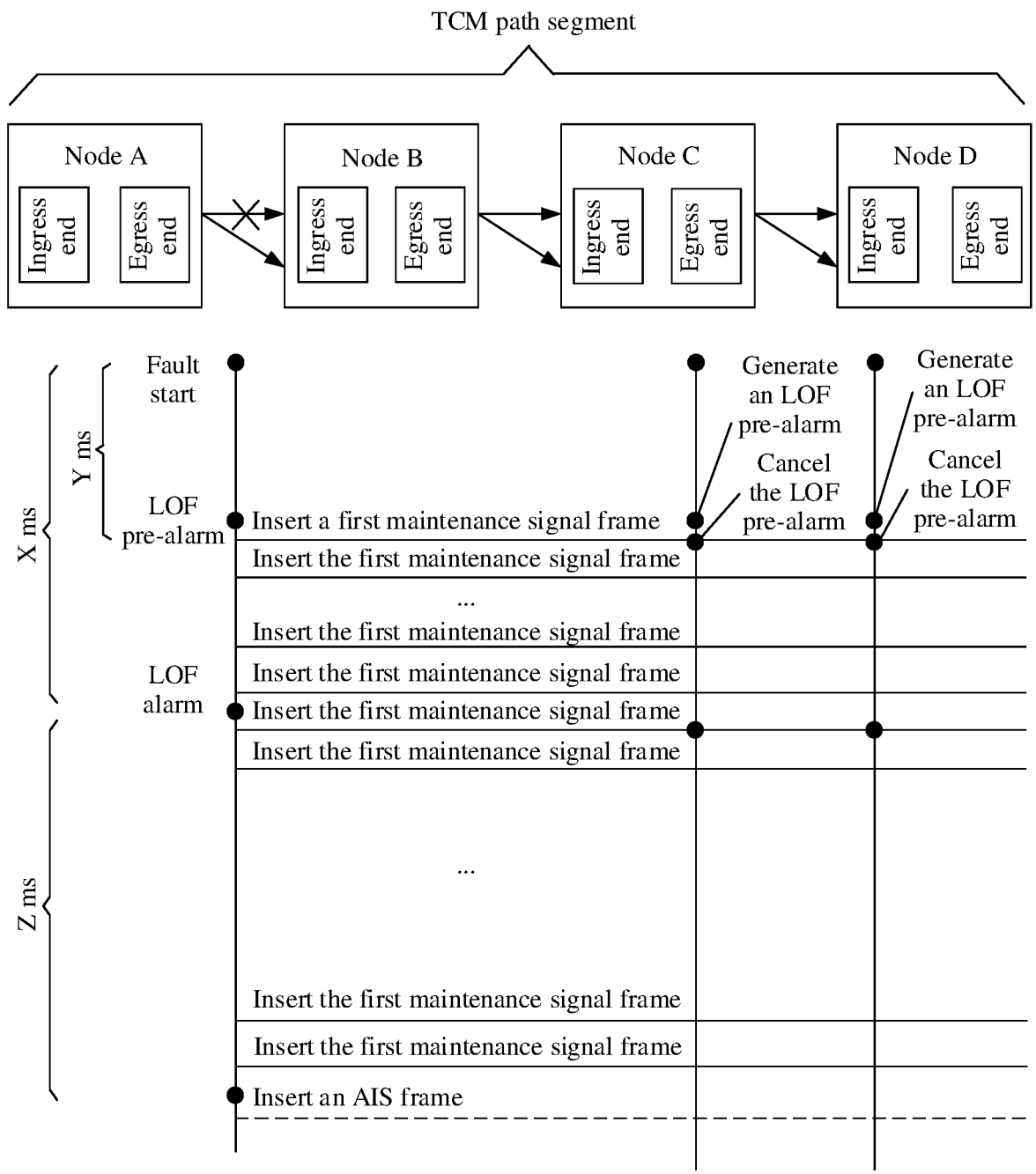
FIG. 9 is a schematic diagram of an alarm processing procedure in SNCP/N TCM cascaded networking according to an embodiment of this application.

In another example, FIG. 9 is used as an example. FIG. 9 is a schematic diagram of an alarm processing procedure in SNCP/N TCM cascaded networking. For example, an end-to-end path includes a node A to a node D configured with an SNCP group. The node A sends a data frame to the node D through a node B and a node C. The node A, the node B, the node C, and the node D are all configured with a TCM function. For example, a TCM mode configured for the node A and the node D is an operational mode, and a TCM mode configured for the node B and the node C is a monitoring mode or a transparent mode. A difference between FIG. 9 and FIG. 8 lies in: In FIG. 8, the node A and the node B, the node B and the node C, and the node C and the node D form three different TCM path segments, and in FIG. 9, the node A to the node D belong to a same TCM path segment. For differentiation, in FIG. 9, a path between the node A and the node B is referred to as a path segment 1, a path between the node B and the node C is referred to as a path segment 2, and a path between the node C and the node D is referred to as a path segment 3. In networking corresponding to FIG. 9, in an existing manner, when a fault occurs between the node A and the node B, and the node C and the node D continuously detect a loss of frame in X ms and generate and report LOF alarms, the node C and the node D also trigger execution of SNCP group switching, and consequently, a case in which the node C and the node D perform mis-switching is caused.

For example, the working channel 1 between the node A and the node B is faulty, but both the working channel 2 and the working channel 3 are normal. In the solution provided in this embodiment of this application, as shown in FIG. 9, when the working channel 1 is faulty, an ingress end of the node B cannot receive a data frame from the node A, that is, when a frame alignment failure is continuously detected in Y ms after the start of the fault, it is detected that an LOF pre-alarm occurs on the working channel 1. An ingress end of the node C cannot receive a data frame from the node B either. Therefore, the node C also detects that an LOF pre-alarm occurs, and the node D also detects that an LOF pre-alarm occurs. When detecting that the LOF pre-alarm occurs on the working channel 1, the node B continuously inserts the first maintenance signal frame at the ingress end. The egress end of the node B forwards the first maintenance signal frame to the node C. After receiving the first maintenance signal frame, the node C can perform normal frame alignment on the first maintenance signal frame, so that the node C does not erroneously detect the LOF alarm, and does not erroneously trigger execution of the SNCP group switching due to erroneous detection of the LOF alarm. After receiving the first maintenance signal frame, the node C sends the first maintenance signal frame to the node D, so that the node D can perform normal frame alignment on the first maintenance signal frame, and further, the node D does not erroneously detect the LOF alarm, and does not erroneously trigger execution of the SNCP group switching due to erroneous detection of the LOF alarm.

A link between the node B and the node C and a link between the node C and the node D belong to a same TCM path segment. Therefore, if a fault such as fiber cut occurs on the working channel 1, the node B generates an LOF alarm when continuously detecting a loss of frame in X ms, and the node B inserts an AIS frame at the ingress end. The node B does not modify TCM overhead in the AIS at the ingress end but directly sends the AIS to the node C. Similarly, after receiving the AIS from the node B, the node C does not modify the TCM overhead in the AIS, and directly transparently transmits the AIS to the node D. After receiving the AIS, the node C and the node D trigger SNCP group switching, and consequently, mis-switching is generated on the node C and the node D.

To prevent the node C and the node D from mis-switching, a feasible manner is: prolonging switching time of the node C and the node D. To prevent the path segment 2 from mis-switching due to a fault, the node C receives the AIS and starts timing. Switching is performed if the MS is continuously received in Z ms. Each time after receiving the AIS from the node B, the node C sends the received AIS to the node D. To prevent the path segment 3 from mis-switching due to a fault, the node D receives the AIS and starts timing. The AIS needs to be continuously received in 2*Z ms to perform switching. After receiving the AIS, the node D cannot determine whether the AIS is sent by the node B or the node C. Therefore, the node D cannot determine whether the path segment 2 is faulty, the path segment 3 is faulty, or both the path segment 2 and the path segment 3 are faulty. Therefore, for time of triggering the node D to perform switching, time used by the node B to complete switching needs to be delayed and added with time used by the node C to complete switching, that is, 2*Z ms. It can be learned from the foregoing descriptions that, starting from a second node, as a distance between each node on a subsequent path and the second node increases, switching delaying time also increases.

To reduce switching delaying duration, the foregoing solution shown in FIG. 7 may be used. After detecting the LOF alarm, the second network device delays insertion of the AIS frame. Specifically, as shown in FIG. 9, if the node B continuously detects a frame alignment failure in X ms from the start of the fault, the node B detects that an LOF alarm occurs on the channel 1. The node B delays insertion of the AIS frame on an ingress port of the working channel 1, and specific delay duration is Z ms. The node B continues to insert the first maintenance signal frame on the ingress port of the working channel 1, and sends the first maintenance signal frame to the node C through the working channel 2 and the protection channel 2. In addition, after detecting that the LOF alarm occurs, the node B triggers execution of sub-network connection protection group switching to switch a receive channel from the working channel 1 to the protection channel 1. Time used by the node B to perform sub-network connection protection group switching is less than or equal to Z ms. After switching, the node B receives the data frame from the node A through the protection channel 1, and the node B terminates insertion of the first maintenance signal frame at the ingress end of the working channel 1. The node B sends the data frame to the node C through the working channel 2 and the protection channel 2. Because the node B delays insertion of the AIS frame, the node C does not erroneously detect an AIS alarm due to receiving of the AIS frame. Therefore, the node C does not perform sub-network connection protection group mis-switching due to erroneous detection of the MS alarm. Similarly, the node D does not erroneously detect the AIS alarm due to receiving of the AIS frame, and therefore does not perform sub-network connection protection group mis-switching due to erroneous detection of the MS alarm.

In the foregoing solution, only insertion of the AIS frame is delayed, and detection of the MS alarm and an occasion of triggering sub-network connection protection group switching are not affected. When the path segment 2 is faulty, the node C can detect the AIS alarm in a timely manner, determine that the path 2 is faulty, and trigger sub-network connection protection group switching in a timely manner, and does not need to delay Z ms before performing switching. Similarly, when the path segment 3 is faulty, the node D can detect the AIS alarm in a timely manner, determine that the path 3 is faulty, and trigger sub-network connection protection group switching in a timely manner, and does not need to delay 2*Z ms before performing switching.

This embodiment of this application may be further applied to an SNCP/N PM cascaded networking scenario. With reference to FIG. 9, SNCP/N PM cascaded networking differs from SNCP/N TCM cascaded networking in the following: In SNCP/N TCM cascaded networking, the node A, the node B, the node C, and the node D are all configured with a TCM function, and in SNCP/N PM cascaded networking, none of the node A, the node B, the node C, and the node D is configured with the TCM function. In an SNCP/N PM cascaded networking scenario, there is also the following technical problem: The node C and the node D cannot receive the data frame, and consequently, the node C and the node D continuously detect a loss of frame in X ms, and generate and report LOF alarms, and consequently, resources are wasted. When a fault occurs between the node A and the node B, and the node C and the node D continuously detect a loss of frame in X ms and generate and report LOF alarms, the node C and the node D trigger execution of SNCP group switching, and consequently, the node C and the node D perform mis-switching. In addition, the node B and the node C belong to a same PM path segment as the node C and the node D, a TCM function is not configured, and PM overhead of the AIS is not modified by each node. Therefore, after receiving the AIS, the node C and the node D trigger SNCP group switching, and consequently, the node C and the node D perform mis-switching. To prevent mis-switching on the node C and the node D, in SNCP/N PM cascaded working, a same switching time delaying manner as that in SNCP/N PM cascaded networking is used. In the solution provided in this embodiment of this application, neither the node C nor the node D erroneously detects an LOF alarm. In addition, when the path segment 2 is faulty, the node C can detect the AIS alarm in a timely manner, determine that a link between the node B and the node C is faulty, and trigger sub-network connection protection group switching in a timely manner, and does not need to delay Z ms before performing switching. Similarly, when a link between the node C and the node D is faulty, the node D can detect the AIS alarm in a timely manner, determine that the path 3 is faulty, and trigger sub-network connection protection group switching in a timely manner, and does not need to delay 2*Z ms before performing switching.

Based on a same concept as the foregoing embodiment, an embodiment of this application further provides an alarm processing apparatus. The method, the apparatus, and a system are based on a same inventive concept. Because the method, the apparatus, and the system have similar problem resolving principles, for implementation of the apparatus and implementation of the method, refer to each other. Repeated parts are not described.

Figure 10:
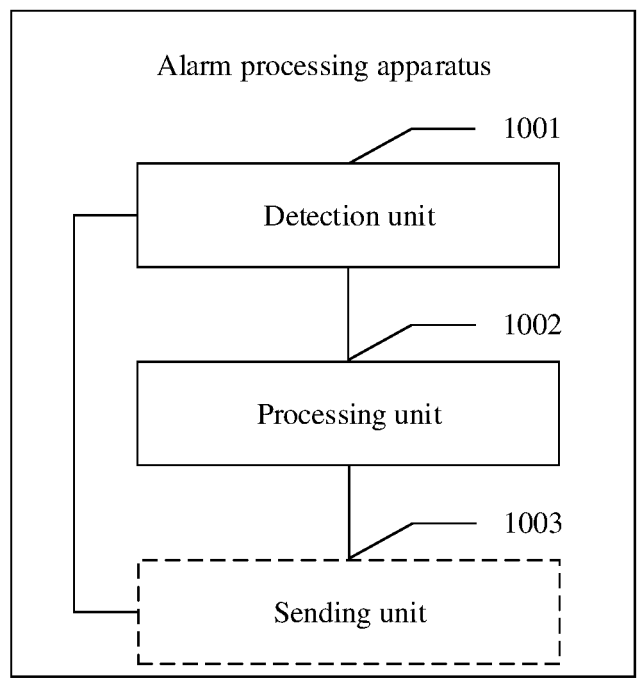
FIG. 10 is a schematic diagram of a structure of a possible alarm processing apparatus according to an embodiment of this application.

The apparatus may be used by a network device (for example, a first network device, a second network device, or a third network device). The apparatus may be specifically a processor, a chip, a chip system, or a module that is in a processor and that is configured to perform a function of the network device. The apparatus may be implemented by the line board in FIG. 2. FIG. 10 is a schematic diagram of a structure of a possible alarm processing apparatus according to an embodiment of this application. As shown in FIG. 10, the apparatus includes a detection unit 1001 and a processing unit 1002. Optionally, the apparatus further includes a sending unit 1003.

For example, the apparatus is applied to the second network device, the detection unit 1001 is configured to perform S401, the processing unit 1002 is configured to perform S402, and the sending unit 1003 is configured to perform S403. For another example, the apparatus is applied to the third network device, the detection unit 1001 is configured to perform S404, and the sending unit 1003 is configured to perform S405. For still another example, the apparatus is applied to the second network device, the detection unit 1001 is configured to perform S701, and the processing unit 1002 is configured to perform S702, S703, and S704.

Optionally, the foregoing three units may further perform another related optional step performed by the first network device, the second network device, or the third network device mentioned in any one of the foregoing embodiments, and details are not described herein again.

In this embodiment of this application, division into the units is an example, and is merely logical function division. In actual implementation, another division manner may be used. In addition, functional units in this embodiment of this application may be integrated into one processor, or each of the units may exist alone physically, or two or more units are integrated into one unit. The integrated unit may be implemented in a form of hardware, or may be implemented in a form of a software functional unit.

Figure 11:
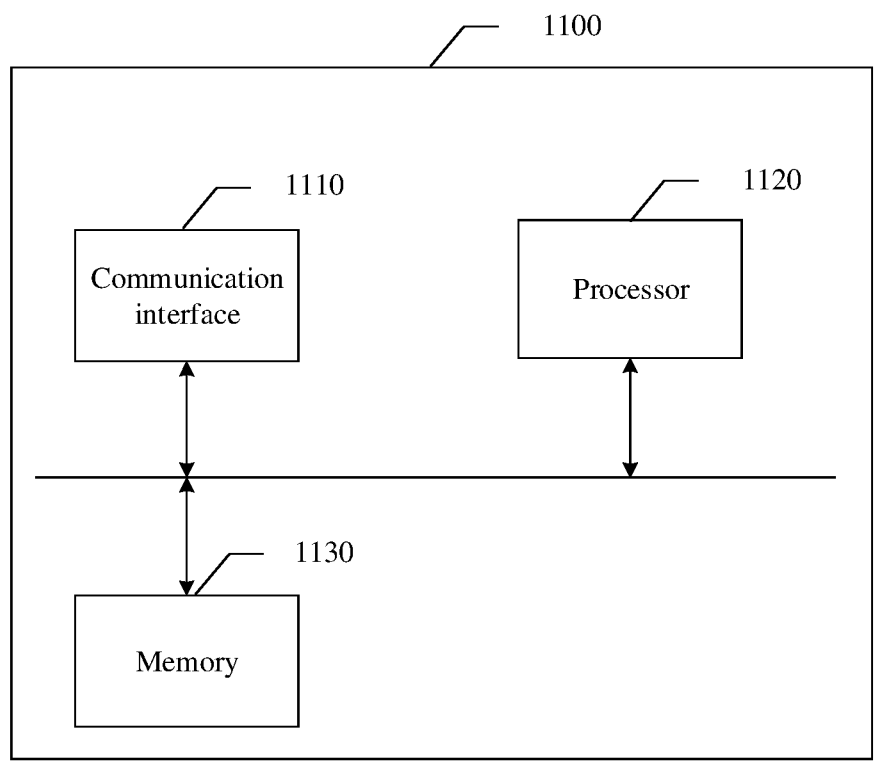
FIG. 11 is a schematic diagram of a structure of another possible alarm processing apparatus according to an embodiment of this application.

FIG. 11 is a schematic diagram of a structure of another possible alarm processing apparatus according to an embodiment of this application. As shown in FIG. 11, an apparatus 1100 includes a communication interface 1110, a processor 1120, and a memory 1130. The apparatus may be applied to a first network device, a second network device, or a third network device.

A detection unit 1001, a processing unit 1002, and a sending unit 1003 shown in FIG. 11 may all be implemented by the processor 1120. For example, the processor 1102 may be the signal processor in the line board shown in FIG. 2. The processor 1120 receives a data frame through the communication interface 1110, and is configured to implement the method performed by the first network device, the second network device, or the third network device in FIG. 4 or FIG. 7. In an implementation process, at each step of a processing procedure, the method performed by the first network device, the second network device, or the third network device in FIG. 4 or FIG. 7 may be implemented by using an integrated logic circuit of hardware or instructions in a form of software in the processor 1120.

The communication interface 1110 may be a circuit, a bus, a transceiver, or any other apparatus that may be configured to perform information exchange. For example, the another apparatus may be a device connected to the apparatus 1100, for example, the another apparatus may be a receive end or an intermediate node.

The processor 1120 may be a general-purpose processor, a digital signal processor, an application-specific integrated circuit, a field programmable gate array or another programmable logic device, a discrete gate or a transistor logic device, or a discrete hardware component. The general-purpose processor may be a microprocessor, or may be any conventional processor or the like. The steps of the method disclosed with reference to embodiments of this application may be directly performed by a hardware processor, or may be performed by a combination of hardware and software units in the processor. Program code executed by the processor 1120 to implement the foregoing method may be stored in the memory 1130. The memory 1130 is coupled to the processor 1120. The coupling in this embodiment of this application is indirect coupling or a communication connection between apparatuses, units, or modules for information exchange between the apparatuses, the units, or the modules, and may be in electrical, mechanical, or other forms. The processor 1120 may cooperate with the memory 1130. The memory 1130 may be a non-volatile memory such as a hard disk drive (HDD) or a solid-state drive (SSD), or may be a volatile memory such as a random access memory (RAM). The memory 1130 is any other medium that can carry or store program code in a form of an instruction structure or a data structure and that can be accessed by a computer, but is not limited thereto.

A specific connection medium between the communication interface 1110, the processor 1120, and the memory 1130 is not limited in this embodiment of this application. In this embodiment of this application, the memory 1130, the processor 1120, and the communication interface 1110 are connected by using a bus in FIG. 1i. The bus is represented by a bold line in FIG. 1i. A connection manner between other components is merely used as schematic descriptions, and is not limited thereto. The bus may be classified into an address bus, a data bus, a control bus, and the like. For ease of representation, only one bold line is used to represent the bus in FIG. 11, but this does not mean that there is only one bus or only one type of bus.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include various media that can store program code, such as a USB flash drive, a removable hard disk, a read-only memory, or a random access memory.

Based on the foregoing embodiments, an embodiment of this application further provides a chip. The chip includes a processor, configured to implement functions involved in any one or more of the foregoing embodiments, for example, obtain or process the data frame involved in the foregoing method. Optionally, the chip further includes a memory, and the memory is configured to store necessary program instructions and data that are executed by the processor. The chip may include a chip, or include a chip and another discrete device.

A person skilled in the art should understand that, in embodiments of this application, a form of a computer program product implemented on one or more computer-usable storage media (including but not limited to a disk memory, a CD-ROM, an optical memory, and the like) that include computer-usable program code may be used.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams. These computer program instructions may alternatively be loaded onto a computer or any other programmable data processing device, so that a series of operation steps are performed on the computer or the any other programmable device to generate computer-implemented processing, and instructions executed on the computer or the any other programmable device provide steps for implementing a specific function in one or more processes in the flowcharts and/or in one or more blocks in the block diagrams.

Clearly, a person skilled in the art can make various modifications and variations to embodiments of this application without departing from the scope of embodiments of this application. In this case, this application is intended to cover these modifications and variations provided that they fall within the scope of protection defined by the following claims and their equivalent technologies.

What is claimed is:
1. An alarm processing method, comprising:
detecting, by a second network device, that a loss of frame (LOF) pre-alarm occurs on a first working channel, wherein the first working channel connects the second network device and a first network device;
inserting, by the second network device, a first maintenance signal frame at an ingress end, wherein the ingress end is configured to receive a data frame from the first network device through the first working channel, and wherein frame alignment is based on the first maintenance signal frame, wherein a detection condition of the LOF pre-alarm is that a frame alignment failure on the data frame from the first network device lasts for a first duration, and wherein the first duration is less than a frame alignment failure duration in a detection condition of a LOF alarm;
detecting, by the second network device, that the LOF alarm occurs on the first working channel;
triggering sub-network connection protection group switching of the second network device; and
inserting the first maintenance signal frame at the ingress end in a third duration;
wherein the first maintenance signal frame is a NULL-type maintenance signal, overhead of the first maintenance signal frame comprises a first value, and the first value indicates that the first maintenance signal frame is the NULL-type maintenance signal, wherein both the first network device and the second network device are configured with a sub-network connection protection group, wherein the third duration is a duration by which insertion of an AIS frame is delayed after the LOF alarm is detected, wherein the third duration is greater than or equal to a duration used by the second network device to complete sub-network connection protection group switching.

2. The method according to claim 1, further comprising:
terminating, by the second network device, based on detecting that the LOF alarm occurs on the first working channel, insertion of the first maintenance signal frame at the ingress end; and
inserting, by the second network device, an alarm indication signal (AIS) frame at the ingress end.

3. The method according to claim 1, wherein the overhead is a path monitoring (PM) segment overhead.

4. The method according to claim 1, wherein the overhead is a tandem connection monitoring (TCM) segment overhead.

5. An alarm processing apparatus, comprising:
one or more processors; and
at least one non-transitory computer-readable memory connected to the one or more processors and including computer program code, wherein the at least one non-transitory computer-readable memory and the computer program code are configured, with the one or more processors, to cause the alarm processing apparatus to at least:
detect that a loss of frame (LOF) pre-alarm occurs on a first working channel, wherein the first working channel connects a second network device and a first network device, wherein a detection condition of the LOF pre-alarm is that a frame alignment failure on a data frame from the first network device lasts for a first duration, and wherein the first duration is less than frame alignment failure duration in a detection condition of a LOF alarm;
insert a first maintenance signal frame at an ingress end, wherein the ingress end is configured to receive the data frame from the first network device through the first working channel, and wherein frame alignment is based on the first maintenance signal frame;
detect that the LOF alarm occurs on the first working channel, triggering sub-network connection protection group switching of the second network device, wherein both the first network device and the second network device are configured with a sub-network connection protection group; and
insert the first maintenance signal frame at the ingress end in a third duration, wherein the third duration is a duration by which insertion of an AIS frame is delayed after the LOF alarm is detected, and the third duration is greater than or equal to a duration used by the second network device to complete sub-network connection protection group switching;
wherein the first maintenance signal frame is a NULL-type maintenance signal, overhead of the first maintenance signal frame comprises a first value, and the first value indicates that the first maintenance signal frame is the NULL-type maintenance signal.

6. The alarm processing apparatus according to claim 5, wherein the computer program code further includes computer program code to cause the alarm processing apparatus to:
terminate, based on detecting that the LOF alarm occurs on the first working channel, insertion of the first maintenance signal frame at the ingress end; and
insert an alarm indication signal (AIS) frame at the ingress end.

7. The alarm processing apparatus according to claim 5, wherein the overhead is a path monitoring (PM) segment overhead.

8. The alarm processing apparatus according to claim 5, wherein the overhead is a tandem connection monitoring (TCM) segment overhead.

9. A non-transitory computer-readable storage medium storing a program to be executed by one or more processors, the program including instructions to:
detect that a loss of frame (LOF) pre-alarm occurs on a first working channel, wherein the first working channel connects a second network device and a first network device, wherein a detection condition of the LOF pre-alarm is that a frame alignment failure on a data frame from the first network device lasts for a first duration, and wherein the first duration is less than frame alignment failure duration in a detection condition of a LOF alarm;
insert a first maintenance signal frame at an ingress end, wherein the ingress end is configured to receive the data frame from the first network device through the first working channel, and wherein frame alignment is based on the first maintenance signal frame;
detect that the LOF alarm occurs on the first working channel, triggering sub-network connection protection group switching of the second network device, wherein both the first network device and the second network device are configured with a sub-network connection protection group; and
insert the first maintenance signal frame at the ingress end in a third duration, wherein the third duration is a duration by which insertion of an AIS frame is delayed after the LOF alarm is detected, and the third duration is greater than or equal to a duration used by the second network device to complete sub-network connection protection group switching;
wherein the first maintenance signal frame is a NULL-type maintenance signal, overhead of the first maintenance signal frame comprises a first value, and the first value indicates that the first maintenance signal frame is the NULL-type maintenance signal.

10. The non-transitory computer-readable storage medium according to claim 9, wherein the instructions further include instructions to:
terminate, based on detecting that the LOF alarm occurs on the first working channel, insertion of the first maintenance signal frame at the ingress end; and
insert an alarm indication signal (AIS) frame at the ingress end.

11. The non-transitory computer-readable storage medium according to claim 9, wherein the overhead is a path monitoring (PM) segment overhead.

12. The non-transitory computer-readable storage medium according to claim 9, wherein the overhead is a tandem connection monitoring (TCM) segment overhead.

* * * * *

UNITED STATES PATENT AND TRADEMARK OFFICE
CERTIFICATE OF CORRECTION

PATENT NO. : 12,375,173 B2
APPLICATION NO. : 18/060913
DATED : July 29, 2025
INVENTOR(S) : Liang Sun Page 1 of 1

It is certified that error appears in the above-identified patent and that said Letters Patent is hereby corrected as shown below:

In the Claims

In Column 21, in Claim 5, Line 29, delete "than" and insert -- than a --.

Signed and Sealed this
Second Day of September, 2025

Coke Morgan Stewart
*Acting Director of the United States Patent and Trademark Office*